US009508321B2

(12) United States Patent
Oh et al.

(10) Patent No.: US 9,508,321 B2
(45) Date of Patent: Nov. 29, 2016

(54) SOURCE DRIVER LESS SENSITIVE TO ELECTRICAL NOISES FOR DISPLAY

(71) Applicant: SILICON WORKS CO., LTD., Daejeon-si (KR)

(72) Inventors: Kwang Il Oh, Daejeon (KR); Yun Tack Han, Anyang-si (KR); Jung Il Seo, Daejeon (KR); Yong Ik Jung, Incheon (KR); Hyun Kyu Jeon, Daejeon (KR)

(73) Assignee: SILICON WORKS CO., LTD., Daejeon-Si (KR)

( * ) Notice: Subject to any disclaimer, the term of this patent is extended or adjusted under 35 U.S.C. 154(b) by 116 days.

(21) Appl. No.: 14/385,225

(22) PCT Filed: Mar. 15, 2013

(86) PCT No.: PCT/KR2013/002114

§ 371 (c)(1),
(2) Date: Sep. 15, 2014

(87) PCT Pub. No.: WO2013/137685

PCT Pub. Date: Sep. 19, 2013

(65) Prior Publication Data

US 2015/0062110 A1 Mar. 5, 2015

(30) Foreign Application Priority Data

Mar. 16, 2012 (KR) ........................ 10-2012-0026908

(51) Int. Cl.
*G09G 5/00* (2006.01)
*G09G 5/18* (2006.01)
(Continued)

(52) U.S. Cl.
CPC .............. *G09G 5/18* (2013.01); *G09G 3/2096* (2013.01); *G09G 3/3688* (2013.01);
(Continued)

(58) Field of Classification Search
CPC ...... G09G 3/2092; G09G 5/18; G09G 5/008; G09G 3/3688; G09G 3/3696; G09G 3/2096
USPC .......................................................... 345/212
See application file for complete search history.

(56) References Cited

U.S. PATENT DOCUMENTS

2008/0246755 A1* 10/2008 Lee .......................... G09G 3/20 345/214
2009/0079719 A1* 3/2009 Lee .......................... G09G 3/20 345/204

(Continued)

FOREIGN PATENT DOCUMENTS

JP 11-214964 8/1999
JP 11-251884 9/1999

(Continued)

OTHER PUBLICATIONS

International Search Report for International Application No. PCT/KR2013/002114, dated Jul. 26, 2013.

*Primary Examiner* — Adam J Snyder
(74) *Attorney, Agent, or Firm* — Kile Park Reed & Houtteman PLLC

(57) ABSTRACT

The present invention relates to a source driver of a display apparatus, and relates to a source driver for display apparatus insensitive to power noise, which forcibly decides an internal operation state as normality in a specific period including a power noise generation period and operates insensitively to the power noise. Accordingly, the display apparatus can normally output an image voltage even though power noise occurs.

14 Claims, 3 Drawing Sheets

(51) Int. Cl.
*G09G 3/36* (2006.01)
*G09G 3/20* (2006.01)

(52) U.S. Cl.
CPC ........... *G09G 3/3696* (2013.01); *G09G 5/008* (2013.01); *G09G 2230/00* (2013.01); *G09G 2310/0275* (2013.01); *G09G 2330/06* (2013.01); *G09G 2330/12* (2013.01)

(56) References Cited

U.S. PATENT DOCUMENTS

2009/0167750 A1* 7/2009 Hong .................. G09G 3/2096 345/213
2010/0039156 A1* 2/2010 Yamaguchi .......... G09G 3/2096 327/291
2010/0066723 A1* 3/2010 Nam ........................ G09G 3/20 345/213
2010/0148829 A1* 6/2010 Hong .................. G09G 3/3648 327/108
2011/0037758 A1* 2/2011 Lim .................... H04L 25/0272 345/213
2011/0158366 A1* 6/2011 Kim ...................... H04L 7/0087 375/371
2011/0181558 A1* 7/2011 Jeon ..................... G09G 3/3611 345/204
2011/0242066 A1* 10/2011 Jeon ......................... G09G 3/20 345/204
2011/0286562 A1* 11/2011 Jeon ......................... G09G 3/20 375/371
2011/0292020 A1* 12/2011 Lee ...................... G09G 3/3688 345/211
2011/0292024 A1* 12/2011 Baek .................... G09G 3/2096 345/212

FOREIGN PATENT DOCUMENTS

JP 2000-341098 12/2000
JP 2009-301107 12/2009
KR 10-0938025 1/2000

* cited by examiner

100

SOURCE DRIVER LESS SENSITIVE TO ELECTRICAL NOISES FOR DISPLAY

TECHNICAL FIELD

The present invention relates to a source driver for a display apparatus, and more particularly, to a source driver for a display apparatus insensitive to power noise, which can normally output an image voltage even though power noise occurs.

BACKGROUND ART

A liquid crystal display apparatus includes a timing controller and a panel driving unit in order to drive a panel that displays image data. The timing controller processes the image data and generates a timing control signal, and the panel driving unit includes a gate driver and a source driver and drives the panel based on the image data and the timing control signal transmitted from the timing controller.

The source driver has a plurality of power output ports for driving horizontal lines of the liquid crystal display apparatus and outputs a voltage at a specific time at which the horizontal lines are driven, thereby generating power noise therein. Since the conventional liquid crystal display apparatus independently includes a clock line required for detecting image data and an image data transmission speed between the timing controller and the source driver is not fast, the conventional liquid crystal display apparatus performs a normal operation even though power noise exists.

In a recent liquid crystal display apparatus, as a high refresh rate (reproduction frequency) with a large area is required, high speed image data transmission is required between a timing controller and a source driver, and a CEDS (CLOCK Embedded Differential Signaling) scheme, in which a clock signal is embedded in a data signal, has been employed.

In such a CEDS scheme, since an independent clock signal is not input from an exterior and the source driver generates a clock signal by itself based on input CED (CLOCK Embedded Data), there is a problem that the CEDS scheme is affected by power noise.

That is, when power noise occurs, since the source driver erroneously recognizes a clock signal and a data signal from the received CED and a lock signal LOCK indicating an operation state of the source driver falls to a Low level, the timing controller enters a CLOCK training stage in which a clock is synchronized, resulting in a problem that an error occurs in image data detection.

DISCLOSURE

Technical Problem

Accordingly, the present invention has been made in an effort to solve the problems occurring in the related art, and an object of the present invention is to provide a source driver for a display apparatus insensitive to power noise, which can normally output an image voltage even though power noise occurs.

Technical Solution

In embodiments, a source driver insensitive to power noise may forcibly decide an internal operation state as normality in a specific period including a power noise generation period and operate insensitively to the power noise.

In an embodiment, the source driver insensitive to power noise may include: a clock data extraction circuit that receives CED (CLOCK Embedded Data) and restores a clock (CLOCK) signal and a data (Data) signal; and a cut-off switch that receives a lock signal (LOCK) that indicates whether the clock data extraction circuit normally operates, and provides a specific signal to the exclusion of the received lock signal in the specific period.

In an embodiment, the source driver insensitive to power noise may further include a lock detection circuit that provides the lock signal while at least the CED is being received. The power noise generation period may include generation time points of control signals that are output by the source driver, and may be periodically generated after a generation time point of the fastest control signal among the control signals.

In an embodiment, the source driver insensitive to power noise may further include a source driver control circuit that receives the restored clock signal and data signal, and generates a noise period start signal immediately before the power noise generation period in response to the lock signal.

In an embodiment, the source driver control circuit may generate a noise period end signal at a time before and after a last control signal among the control signals.

In an embodiment, the source driver control circuit may further include a noise masking circuit that generates a noise mask signal before a start time point of the power noise generation period based on the noise period start signal and the noise period end signal.

In an embodiment, the noise masking circuit may transition the noise mask signal to a first logic state when the noise period start signal is received, and maintain the noise mask signal in the first logic state until the noise period end signal is received.

In an embodiment, the clock data extraction circuit may receive the noise mask signal from the noise masking circuit, generate a cut-off control signal, and control the cut-off switch.

In an embodiment, when the noise mask signal is transitioned to a first logic state, a first terminal of the cut-off switch may be connected to the first logic state in response to the cut-off control signal, and a second terminal of the cut-off switch may be connected to the source driver control circuit.

In an embodiment, when the noise mask signal is transitioned to a second logic state, a first terminal of the cut-off switch may be connected to the lock detection circuit in response to the cut-off control signal, and a second terminal of the cut-off switch may be connected to the source driver control circuit.

In an embodiment, the source driver insensitive to power noise may further include a voltage output circuit for image display that outputs a voltage for image display based on a control signal received from the source driver control circuit.

In an embodiment, the display apparatus may correspond to a liquid crystal display apparatus.

In an embodiment, the source driver insensitive to power noise may be attached to the liquid crystal display apparatus in the form of chip-on-film (COF) or chip-on-glass (COG).

In embodiments, a display apparatus may include a source driver. The display apparatus may forcibly decide an internal operation state as normality in a specific period including a power noise generation period and operate insensitively to the power noise.

Advantageous Effects

The disclosed technology may have the following effects. However, since it does not represent that a specific embodiment should include all the following effects or should include only the following effects, it should not be understood that the scope of the disclosed technology is limited thereby.

The source driver insensitive to power noise according to an embodiment of the present invention can forcibly decide an internal operation state in a specific period including an internal power generation period as normality, thereby normally outputting an image voltage.

BRIEF DESCRIPTION OF THE DRAWINGS

The above objects, and other features and advantages of the present invention will become more apparent after a reading of the following detailed description taken in conjunction with the drawings, in which.

BEST MODE FOR THE INVENTION

Since a description for the present invention is an embodiment for a structural and functional description, it should not be interpreted that the scope of the present invention is limited by the embodiment described in the body. That is, since the embodiment can be modified in various forms, it should be understood that the scope of the present invention includes equivalents capable of realizing the technical sprit.

The meaning of terms used in the present invention should be understood as follows.

The terms such as "first" and "second" are used for distinguishing one element from another, and the scope should not be limited by the terms. For example, a first element may be named as a second element, and similarly, the second element may also be named as the first element.

It should be understood that when an element is referred to as being "connected" to another element, it can be directly connected to the other element or intervening elements may be present. In contrast, it should be understood that when an element is referred to as being "directly connected" to another element, there are no intervening elements present. Furthermore, other expressions for describing a relation between elements, that is, "between", "directly between", "adjacent", and "directly adjacent" should be interpreted in a like fashion.

It should be understood that the singular forms are intended to include the plural forms as well, unless the context clearly indicate otherwise. It should be understood that the terms "comprise", "comprising", "include", and/or "including", when used herein, specify the presence of state features, integers, steps, operations, elements, components, and/or groups thereof, but do not preclude the presence or addition of one or more other features, integers, steps, operations, elements, components, and/or groups thereof.

All terms used herein have the same meanings as those generally understood by those skilled in the art of the present invention, unless not specifically defined. It should be understood that terms defined in the dictionary generally used coincide with meanings in the context of the related technology, and it cannot be interpreted that the terms have ideally or excessively formal meanings, unless not clearly defined in the present invention.

Figure 1:
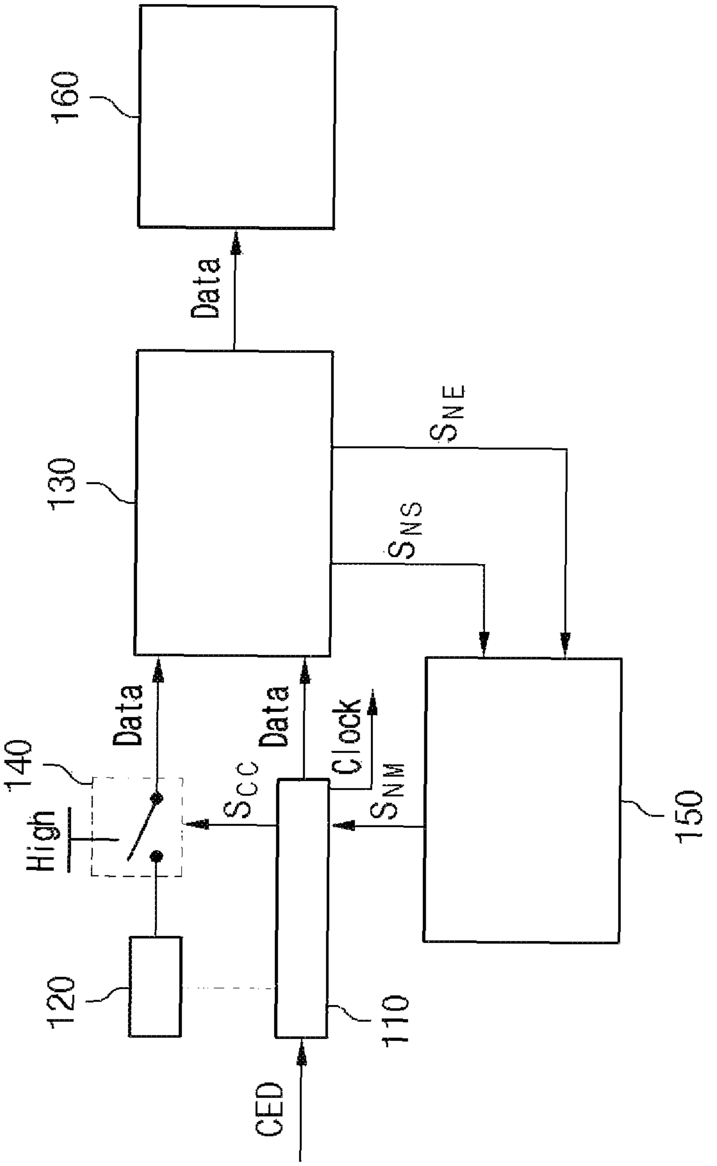
FIG. 1 is a diagram schematically illustrating the configuration of a source driver for a display apparatus insensitive to power noise according to the present invention.

FIG. 1 is a diagram schematically illustrating the configuration of a source driver for a display apparatus insensitive to power noise according to the present invention.

Referring to FIG. 1, the source driver for a display apparatus insensitive to power noise includes a clock data extraction circuit (110), a lock detection circuit (120), a source driver control circuit (130), a cut-off switch (140), and a noise masking circuit (150).

The clock data extraction circuit (110) receives CED in which a clock signal has been embedded between data signals, restores the clock signal and the data signals, and provides the restored signals to the source driver control circuit (130).

The lock detection circuit (120) detects whether the clock data extraction circuit (110) normally operates, and outputs a lock signal. In an embodiment, the lock detection circuit (120) may provide the source driver control circuit (130) with the lock signal while at least the CED is being received.

In an embodiment, the lock detection circuit (120) monitors the operation state of the clock data extraction circuit (110), and outputs a lock signal corresponding to a first logic state at a High Level when the clock data extraction circuit (110) normally operates, and outputs a lock signal corresponding to a second logic state at a Low Level when the clock data extraction circuit (110) does not normally operate.

The source driver control circuit (130) receives the clock signal and the data signals restored by the clock data extraction circuit (110), generates control signals in response to the lock signal, and outputs data signals.

In more detail, the source driver control circuit (130) may generate the control signals in order to control a voltage output circuit (160) of the source driver for a plurality of horizontal lines in the display apparatus. The control signals may correspond to $S_{C1}$ to $S_{CN}$ in correspondence with a resultant obtained by dividing the total number of pixels in each horizontal line by N. The source driver control circuit (130) sequentially generates the control signals and distributes the operation of the voltage output circuit (160), thereby reducing power noise.

In an embodiment, the source driver control circuit (130) may predict a power noise generation period. The power noise generation period may include the generation time points of the control signals that are output from the source driver, and may be periodically generated after the generation time point of the fastest control signal among the control signals. For example, the source driver control circuit (130) may predict a period, in which the control signals are generated for a Horizontal-Blank Time, as the power noise generation period according to statistics in which power noise occurs by control signals generated for the Horizontal-Blank Time before secondary image data transmission after primary image data transmission.

In an embodiment, the source driver control circuit (130) may generate a noise period start signal based on the predicted power noise generation period. The noise period start signal may correspond to a signal for reporting, to an exterior, that the power noise will occur. For example, the source driver control circuit (130) may generate the noise period start signal before a specific time (for example, before two cycles) as compared with a predicted power noise generation time point. The cycle may be decided by a clock signal and may be changed according to a required circuit.

In an embodiment, the source driver control circuit (130) may generate a noise period end signal ($S_{NE}$) based on the predicted power noise generation period. The noise period end signal ($S_{NE}$) may correspond to a signal for reporting, to an exterior, that the power noise will disappear. For example, the source driver control circuit (130) may generate the noise period end signal ($S_{NE}$) before a specific time (for example, before three cycles) as compared with predicted power noise disappearance. In another example, the source driver control circuit (130) may generate the noise period end signal ($S_{NE}$) before a clock training stage is ended, or before the horizontal-blank time, that is, before entering an image data transmission period in which valid image data is input. The noise masking circuit (150) receives the noise period start signal ($S_{NS}$) from the source driver control circuit (130), outputs a noise mask signal ($S_{NM}$), and provides the noise mask signal ($S_{NM}$) to the clock data extraction circuit (110). The noise mask signal ($S_{NM}$) may be the basis of a cut-off control signal for controlling the cut-off switch (140) such that the source driver can operate regardless of the power noise. The cut-off switch (140) will be described later.

In an embodiment, the noise masking circuit (150) may transit the noise mask signal ($S_{NM}$) to a first logic state at a high (High) level when the noise period start signal ($S_{NS}$) is received, and transit the noise mask signal ($S_{NM}$) to a second logic state at a low (Low) level after a predetermined time passes.

The noise masking circuit (150) may further receive the noise period end signal ($S_{NE}$) from the source driver control circuit (130).

In an embodiment, the noise masking circuit (150) may transit the noise mask signal ($S_{NM}$) to the first logic state at a high (High) level when the noise period start signal ($S_{NS}$) is received, and maintain the noise mask signal ($S_{NM}$) at the first logic state until the noise period end signal ($S_{NE}$) is received. That is, when the noise period end signal ($S_{NE}$) is received, the noise masking circuit (150) may transit the noise mask signal ($S_{NM}$ to the second logic state at a low (Low) level.

For example, the noise masking circuit (150) may generate a noise mask maintaining the first logic state after the noise period start signal ($S_{NS}$) is received and then one clock, and generate the noise mask maintaining the second logic state after the noise period end signal ($S_{NE}$) is received and then three clocks.

The cut-off switch (140) controls a connection between the lock detection circuit (120) and the source driver control circuit (130).

In more detail, the clock data extraction circuit (110) may receive the noise mask signal ($S_{NM}$), and generate a cut-off control signal ($S_{NM}$) for controlling a connection of the cut-off switch (140) according to the logic state of the noise mask, and the cut-off switch (140) may control a connection between the lock detection circuit (120) and the source driver control circuit (130) according to the cut-off control signal.

The cut-off switch (140) has two terminals. One terminal (a first terminal) of the cut-off switch may be connected to the first logic state or the lock detection circuit (120) according to the cut-off control signal, and the other terminal (a second terminal) may be connected to the source driver control circuit (130).

In an embodiment, when the noise mask signal ($S_{NM}$) is transitioned to the first logic state at a high (High) level, the cut-off switch (140) may connect the first terminal to the first logic state at a high (High) level in response to a first cut-off control signal ($S_{CC}$) corresponding to the transition.

In another embodiment, when the noise mask signal ($S_{NM}$) is transitioned to the second logic state at a low (Low) level, the cut-off switch (140) may connect the first terminal to the lock detection circuit (120) in response to a second cut-off control signal ($S_{CC}$) corresponding to the transition.

Preferably, the source driver for a display apparatus insensitive to power noise according to the present invention further includes the voltage output circuit (160) for image display, which recognizes the data signal transferred from the source driver control circuit (130) and outputs a voltage for image display.

Preferably, the source driver for a display apparatus insensitive to power noise according to the present invention has a high refresh rate with a large area and is applied to a liquid crystal display apparatus using a CEDS scheme.

The source driver for a display apparatus insensitive to power noise according to the present invention may be attached to the liquid crystal display apparatus in the form of chip-on-film (COF) in which a chip is mounted on a film for attachment or chip-on-glass (COG).

Hereinafter, a detailed operation of the source driver for a display apparatus insensitive to power noise according to the present invention will be described.

In the source driver for a display apparatus insensitive to power noise according to the present invention, when power noise occurs, the noise mask signal ($S_{NM}$ is generated in the source driver, and the clock data extraction circuit (110) fixes a lock signal, which indicates the operation state of the source driver, to the first logic at a high (High) level.

In more detail, the source driver control circuit (130) predicts the power noise generation period, generates the noise period start signal ($S_{NS}$), provides the noise period start signal ($S_{NS}$) to the noise masking circuit (150), and reports the occurrence of the power noise.

The noise masking circuit (150) transitions the noise mask signal ($S_{NM}$) to the first logic at a high (High) level based on the received noise period start signal ($S_{NS}$), and provides the noise mask signal ($S_{NM}$) to the clock data extraction circuit (110).

The clock data extraction circuit (110) generates a first cut-off control signal in response to the noise mask signal ($S_{NM}$) received from the noise masking circuit (150).

The cut-off switch (140) receives the first cut-off control signal and connects the first terminal to the first logic at a high (High) level.

For the aforementioned process, the clock data extraction circuit (110) temporarily performs an abnormal operation by the power noise, but the cut-off switch (140) fixes the lock signal to the first logic state, so that the source driver control circuit (130) can maintain a normal operation regardless of the power noise.

Then, the source driver control circuit (130) generates the noise period end signal ($S_{NE}$) at the time point at which the predicted power noise generation period is ended or before valid image data is received, and provides the noise period end signal ($S_{NE}$) to the noise masking circuit (150), thereby reporting that the power noise will disappear.

The noise masking circuit (150) lowers the noise mask signal ($S_{NM}$) to the second logic at a low (Low) level based on the received noise period end signal ($S_{NE}$), and provides the noise mask signal ($S_{NM}$) to the clock data extraction circuit (110).

The clock data extraction circuit (110) generates a second cut-off control signal in response to the noise mask signal ($S_{NM}$) received from the noise masking circuit.

The cut-off switch (140) receives the second cut-off control signal and connects the first terminal to the lock detection circuit (120). Consequently, the source driver control circuit (130) can perform a normal operation according to the lock signal received in the lock detection circuit (120).

As a consequence, even though the power noise occurs, it is possible to normally recognize data and output an image voltage without being affected by the power noise, thereby realizing a stable operation of the source driver in a high speed liquid crystal display apparatus with a large screen.

Figure 2:
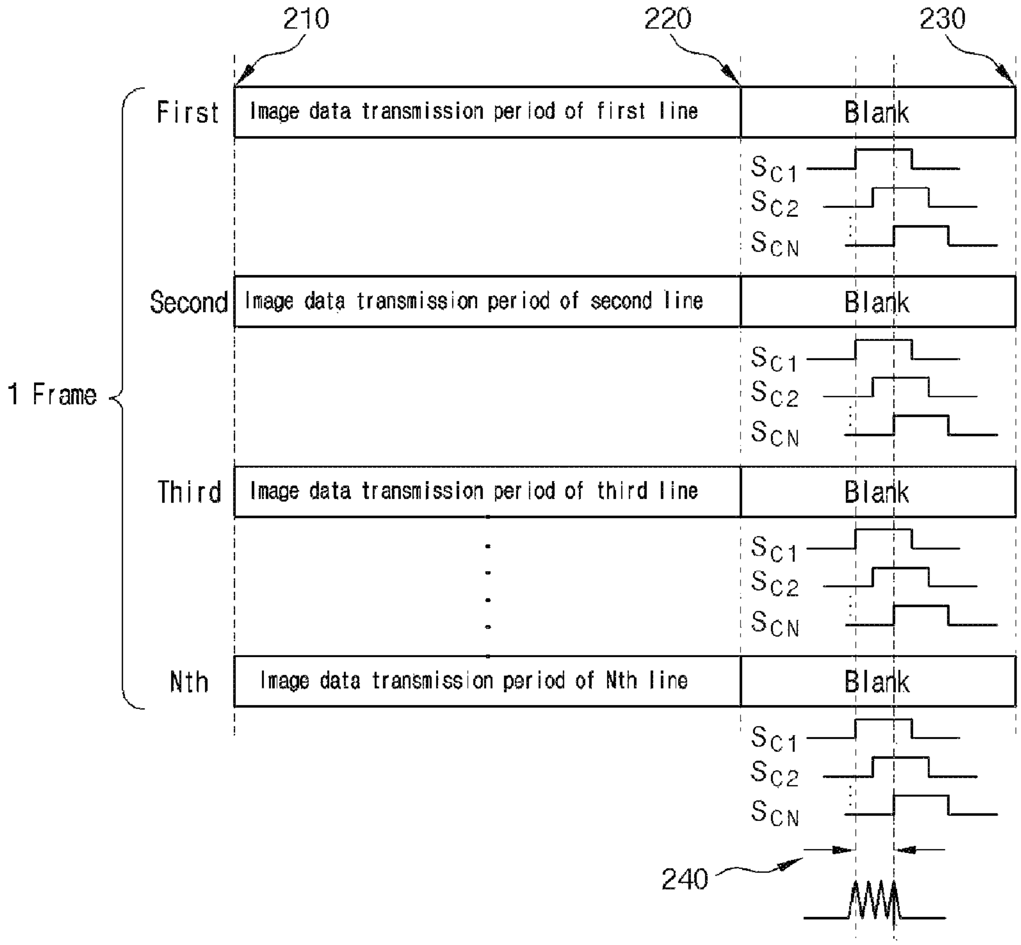
FIG. 2 is a diagram illustrating a power noise generation period of a source driver for a display apparatus insensitive to power noise according to the present invention.

FIG. 2 is a diagram illustrating the power noise generation period of the source driver for a display apparatus insensitive to power noise according to the present invention.

Referring to FIG. 2, the source driver supplies a voltage such that a display apparatus outputs a screen according to data signals. The display apparatus may output an image in units of frames, and a frame output time may be decided by the number of frames per second. The frame output time includes an image data transmission period and a Horizontal-Blank time. The image data transmission period corresponds to a period in which valid data is transmitted from the time point (210) at which data is transmitted to the first pixel of a horizontal line to the time point (220) at which data is transmitted to the last pixel within one frame output time, and the Horizontal-Blank time corresponds to a period from the time point at which the transmission period of the valid data is ended to the time point (230) at which the one frame output time is ended.

When the source driver control circuit (130) generates only one control signal and controls the voltage output circuit (160) for image display to output a voltage, since a voltage is concentrated at the time point at which the voltage is output, the source driver may generate power noise therein. Accordingly, the source driver control circuit (130) divides the total number of pixels in each horizontal line by n to generate control signals ($S_{C1}$ to $S_{CN}$), and distributes output such that a voltage can be sequentially output in response to each of the control signals, so that the size of the power noise can be reduced to 1/n as compared with the conventional art. However, in this case, the generation period of the power noise may be widened as compared with the conventional art.

The source driver control circuit (130) may predict a period, in which the control signals are generated, as the power noise generation period based on the statistics in which power noise occurs by control signals generated for the Horizontal-Blank time. In more detail, the source driver control circuit (130) may predict a period from the generation time point of the first control signal ($S_{C1}$) to the generation time point of the last control signal ($S_{CN}$) as the power noise generation period 240.

Figure 3:
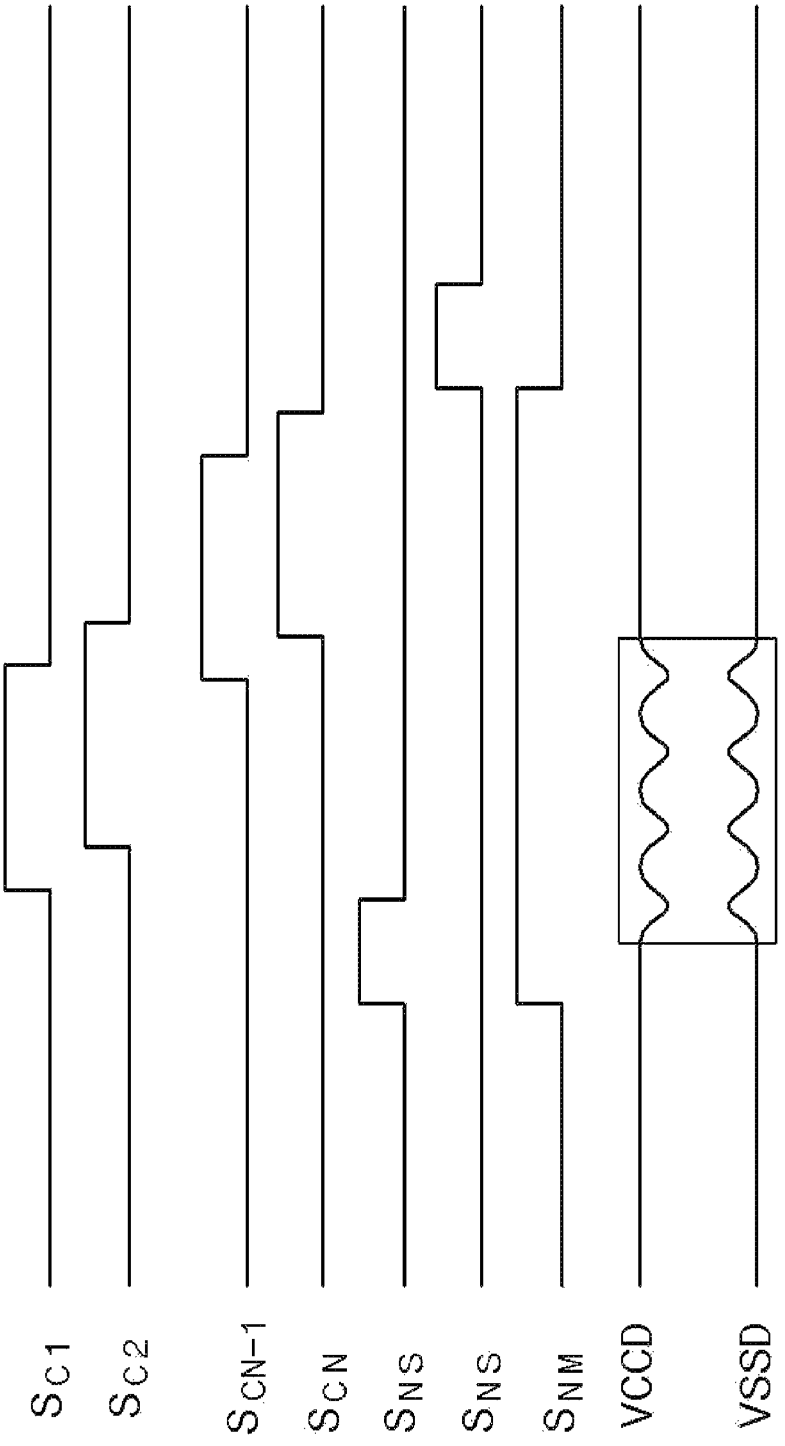
FIG. 3 is a diagram illustrating an operation timing of a source driver for a display apparatus insensitive to power noise according to the present invention.

FIG. 3 is a diagram illustrating the operation timing of the source driver for a display apparatus insensitive to power noise according to the present invention.

Referring to FIG. 3, power noise occurs by the first to $n^{th}$ control signals ($S_{C1}$ to $S_{CN}$) generated in the source driver control circuit (130).

The source driver control circuit (130) predicts the power noise generation period and generates the noise period start signal ($S_{NS}$) before the power noise occurs.

The noise masking circuit (150) receives the noise period start signal ($S_{NS}$) and transitions the noise mask signal ($S_{NM}$) to the first logic state at a High level.

At this time, the clock data extraction circuit (110) generates the first cut-off control signal ($S_{CC}$) and transitions the lock signal to the first logic state at a high (High) level.

Then, the source driver control circuit (130) generates the noise period end signal ($S_{NE}$) at the time point at which the power noise disappears, and the noise masking circuit (150) receives the noise period end signal ($S_{NE}$) and transitions the noise mask signal ($S_{NM}$) to the second logic state at a low (Low) level.

At this time, the clock data extraction circuit (110) generates the second cut-off control signal ($S_{NM}$) to allow the cut-off switch (140) to connect the lock detection circuit (120) and the source driver control circuit (130) to each other, and the source driver control circuit (130) continues a normal operation according to the lock signal received from the lock detection circuit (120).

That is, during the time for which peak noise of logic circuit power (VCCD, VSSD) occurs by the first to $n^{th}$ control signals ($S_{C1}$ to $S_{CN}$) generated in the source driver, the noise mask signal ($S_{NM}$) is maintained at the high (High) level, and the lock signal is fixed to the first logic state at a high (High) level, so that the normal operation of the source driver is maintained.

As described above, in accordance with the source driver for a display apparatus insensitive to power noise according to the present invention, an internal operation state in a specific period including a power noise generation period is forcibly decided as normality, so that the source driver can perform a normal operation regardless of the occurrence of power noise.

Although a preferred embodiment of the present invention has been described for illustrative purposes, those skilled in the art will appreciate that various modifications, additions and substitutions are possible, without departing from the scope and the spirit of the invention as disclosed in the accompanying claims.

The invention claimed is:

1. A source driver for a display apparatus insensitive to power noise, which sets a generation period of control signals for controlling an image of one frame to be outputted through a plurality of image lines as a power noise generation period, periodically sets the power noise generation period in units of one frame, forcibly decides an internal operation state as normality in the power noise generation period, and operates insensitively to the power noise.

2. The source driver for a display apparatus insensitive to power noise of claim 1, wherein the source driver comprises:

a clock data extraction circuit that receives CED (CLOCK Embedded Data) and restores a clock (CLOCK) signal and a data (Data) signal; and a cut-off switch that receives a lock signal (LOCK) that indicates whether the clock data extraction circuit normally operates, and provides a specific signal to the exclusion of the received lock signal in the power noise generation period.

3. The source driver for a display apparatus insensitive to power noise of claim 2, wherein the source driver further comprises:

a lock detection circuit that provides the lock signal while at least the CED is being received.

4. The source driver for a display apparatus insensitive to power noise of claim 1, wherein the source driver further comprises:

a source driver control circuit that receives the restored clock signal and data signal, and generates a noise period start signal immediately before the power noise generation period in response to the lock signal.

5. The source driver for a display apparatus insensitive to power noise of claim 4, wherein the source driver control circuit generates a noise period end signal at a time before and after a last control signal among the control signals.

6. The source driver for a display apparatus insensitive to power noise of claim 5, wherein the source driver further comprises:

a noise masking circuit that generates a noise mask signal before a start time point of the power noise generation period based on the noise period start signal and the noise period end signal.

7. The source driver for a display apparatus insensitive to power noise of claim 6, wherein the noise masking circuit transitions the noise mask signal to a first logic state when the noise period start signal is received, and maintains the noise mask signal in the first logic state until the noise period end signal is received.

8. The source driver for a display apparatus insensitive to power noise of claim 6, wherein the clock data extraction circuit receives the noise mask signal from the noise masking circuit, generates a cut-off control signal, and controls the cut-off switch.

9. The source driver for a display apparatus insensitive to power noise of claim 8, wherein, when the noise mask signal is transitioned to a first logic state, a first terminal of the cut-off switch is connected to the first logic state in response to the cut-off control signal, and a second terminal of the cut-off switch is connected to the source driver control circuit.

10. The source driver for a display apparatus insensitive to power noise of claim 8, wherein, when the noise mask signal is transitioned to a second logic state, a first terminal of the cut-off switch is connected to the lock detection circuit in response to the cut-off control signal, and a second terminal of the cut-off switch is connected to the source driver control circuit.

11. The source driver for a display apparatus insensitive to power noise of claim 5, wherein the source driver further comprises:

a voltage output circuit for image display that outputs a voltage for image display based on a control signal received from the source driver control circuit.

12. The source driver for a display apparatus insensitive to power noise of claim 1, wherein the display apparatus includes a liquid crystal display apparatus.

13. The source driver for a display apparatus insensitive to power noise of claim 1, wherein the source driver is attached to the liquid crystal display apparatus in a form of chip-on-film (COF) or chip-on-glass (COG).

14. A display apparatus including a source driver, wherein the source driver sets a generation period of control signals for controlling an image of one frame to be outputted through a plurality of image lines as a power noise generation period, periodically sets the power noise generation period in units of one frame, forcibly decides an internal operation state as normality in the power noise generation period, and operates insensitively to the power noise.

* * * * *